Aug. 2, 1955 F. SCHAUB 2,714,224
APPARATUS FOR GRANULATING CHEMICAL SUBSTANCES
Filed Aug. 22, 1951 5 Sheets-Sheet 1
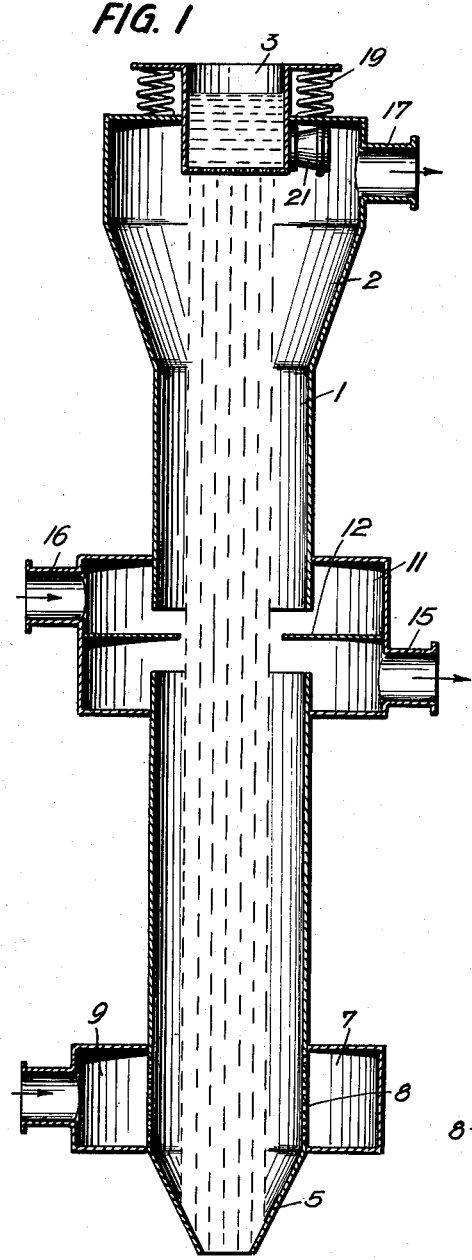
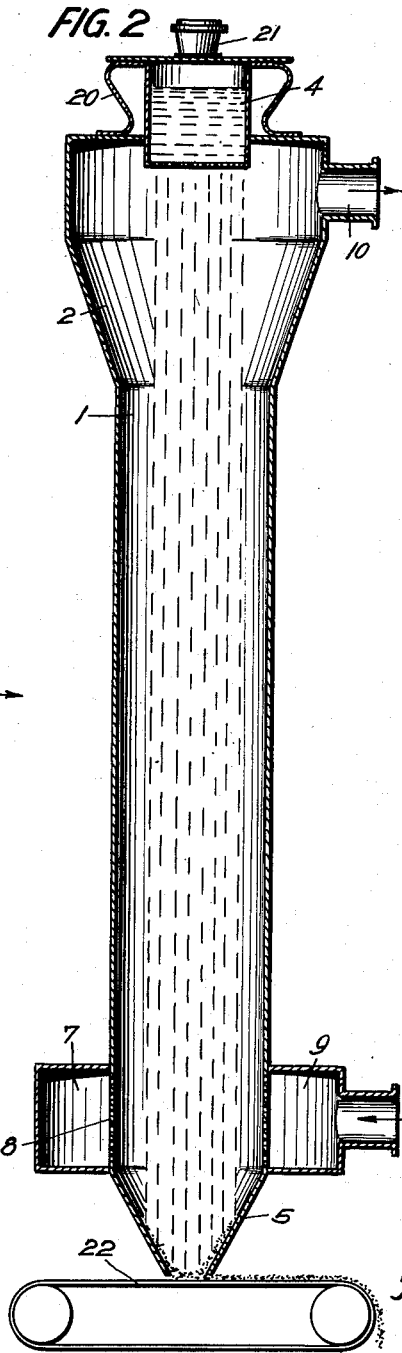
INVENTOR
Franz Schaub
BY Burgess & Dinklage
ATTORNEY

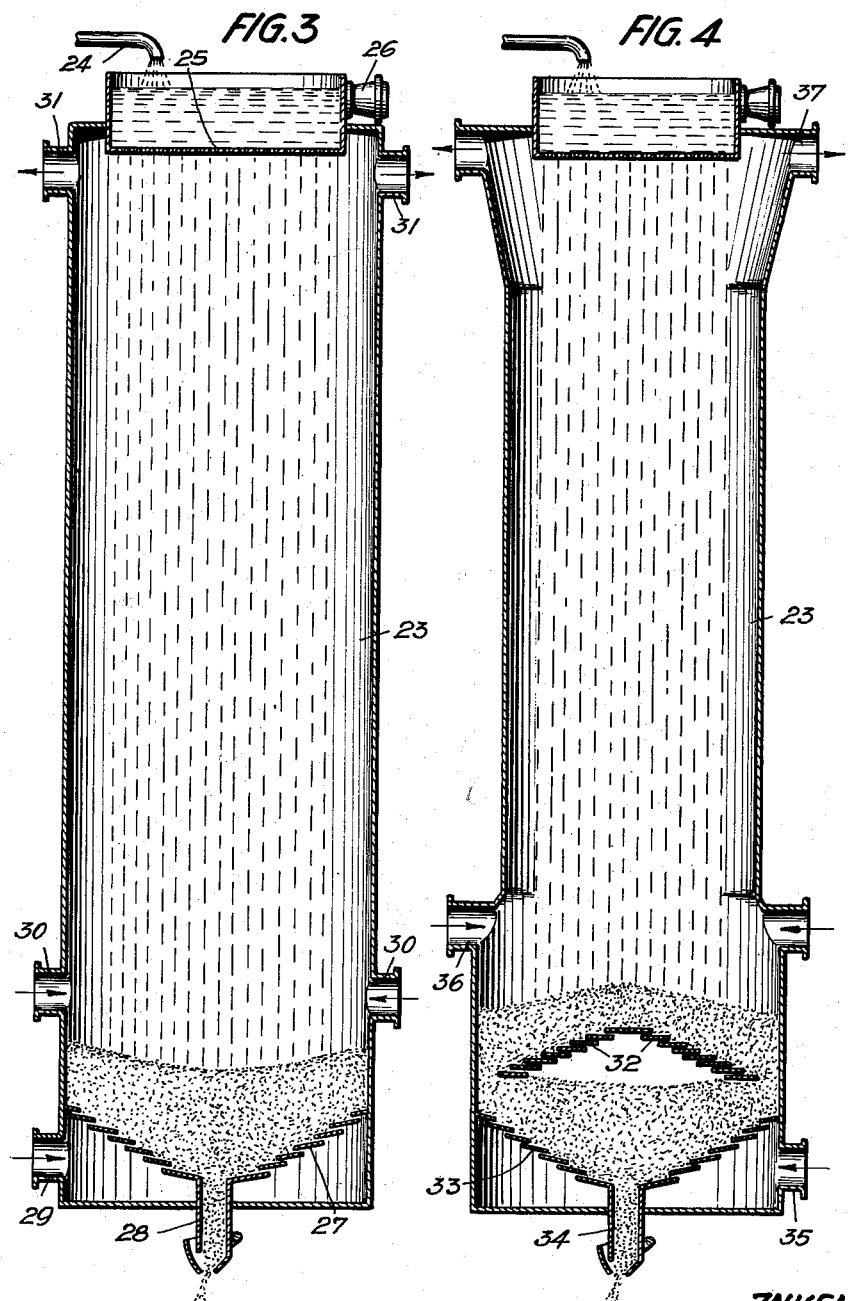

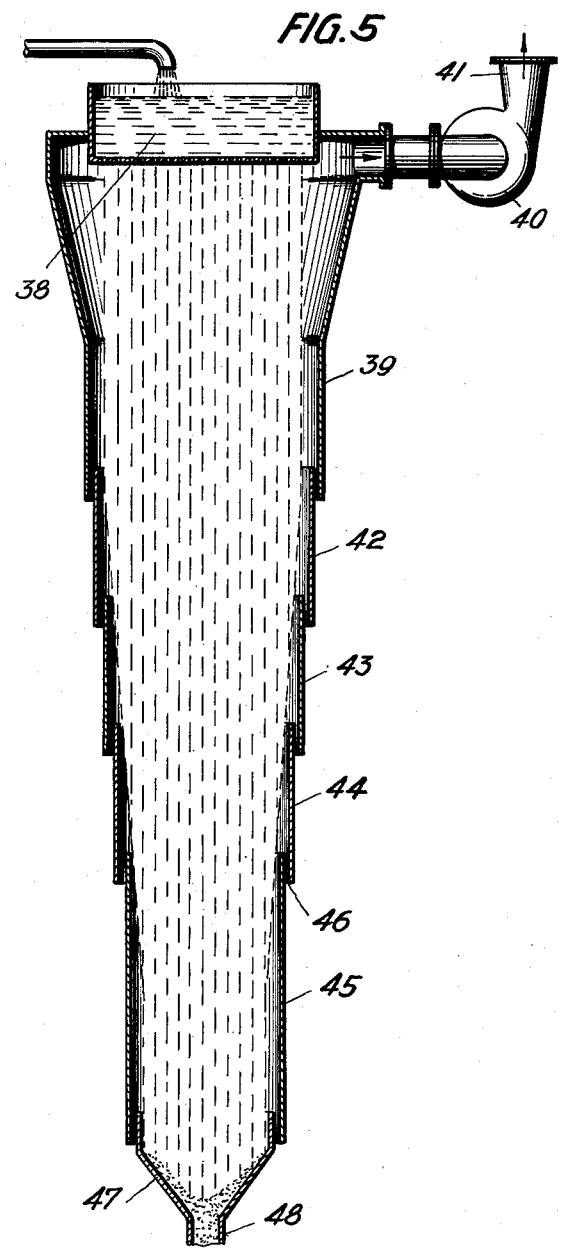

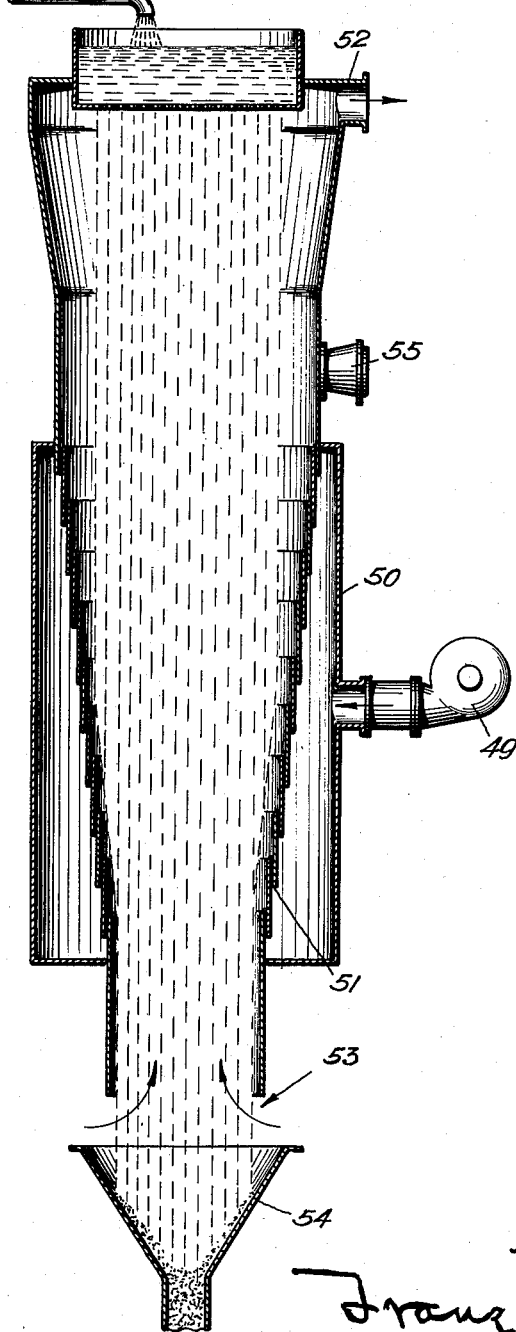

Aug. 2, 1955  F. SCHAUB  2,714,224
APPARATUS FOR GRANULATING CHEMICAL SUBSTANCES
Filed Aug. 22, 1951  5 Sheets-Sheet 5
FIG. 7
FIG. 6A
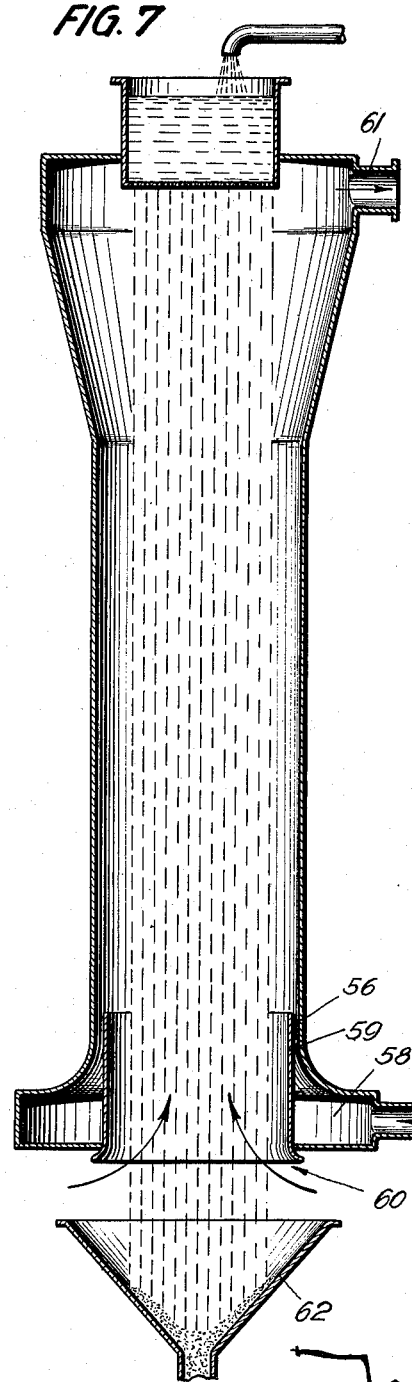
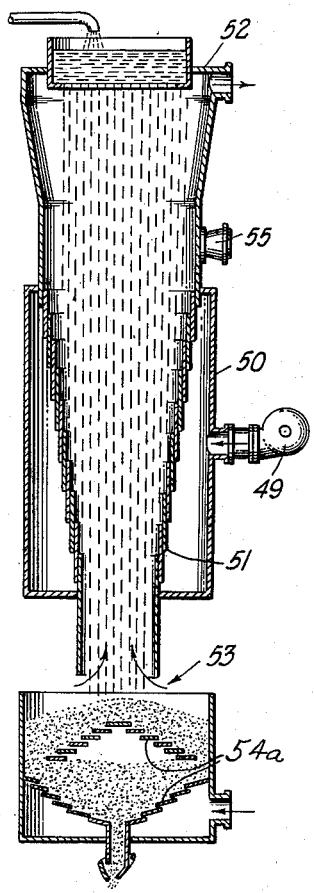
INVENTOR
Franz Schaub
BY Burgess Dinklage
ATTORNEY

United States Patent Office 2,714,224
Patented Aug. 2, 1955

2,714,224

APPARATUS FOR GRANULATING CHEMICAL SUBSTANCES

Franz Schaub, Oberhausen-Holten, Germany, assignor to Ruhrchemie Aktiengesellschaft, Oberhausen-Holten, Germany, a corporation of Germany Application August 22, 1951, Serial No. 243,091

Claims priority, application Germany September 23, 1950

12 Claims. (Cl. 18—2.7)

This invention relates to apparatus for granulating chemical substances. It more particularly relates to the granulation of fertilizers.

Many chemical substances and in particular fertilizer salts, such as calcium-ammonium nitrate, can be granularly solidified and granulated by cooling their melts, which may possibly be aqueous. The hot molten material flows in this connection out of either a continuous melting furnace provided with a screen bottom or a rotating receptacle, and falls through a vertical cylindrical receptacle. While it is dropping, the still liquid, molten drops solidify. The finished granulated material collects on the bottom of the receptacle and is removed by mechanical conveyors and may possibly be led away for some further treatment.

For a sufficient compacting and granulating of the molten material, a definite time of fall of the molten drops is required. This time of fall depends on the water content and the temperature of the melt, so that the drops, upon striking against the bottom of the granulating tower, are sufficiently solidified and do not bake together again. The time of fall necessary can be effected only in extremely high towers, which results in considerable equipment costs.

One object of this invention is to overcome the aforementioned difficulties and to effect the granulation of molten material in a much shorter tower than was heretofore possible. This, and still further objects, become apparent from the following description read in conjunction with the drawings in which:

Fig. 1 diagrammatically shows an embodiment of a granulating tower according to the invention with an arrangement for passing in cooling gases at two different places in the tower.

Fig. 2 diagrammatically shows another embodiment of a granulating tower according to the invention with a conveyer for removing the granulated material from the tower.

Fig. 3 shows another embodiment of a granulating tower according to the invention with a grid bottom;

Fig. 4 shows an embodiment of a granulating tower according to the invention with a double grid bottom;

Fig. 5 shows an embodiment of a cooling tower according to the invention for preventing adhesion of the granulated material to the sides of the tower;

Fig. 6 shows a different embodiment of the type of construction shown in Fig. 5, and Fig. 6a shows still further embodiment of the type of construction shown in Figs. 5 and 6.

Fig. 7 shows an embodiment of a tower according to the invention with an injector type air pump.

It has been found that in the granulation of molten salts and similar substances, it is possible to obtain a considerable reduction of the tower height heretofore necessary, if air or some other cooling gas is allowed to flow upward in counter-current to the downward-flowing drops of melt in a vertical tubular container with a velocity which will reduce the velocity of fall of the molten material. Due to the slowed velocity of fall thus brought about, a considerably better heat exchange between the cooling air and the downward-flowing material takes place. In this connection it is advisable for the mass, which is flowing downward in the form of molten drops, to be surrounded by a relatively narrow pipe, so that the cooling air flowing upward in counter-current can reduce the velocity of fall to the maximum extent and bring about a correspondingly longer stay of the molten drops within the granulating device.

At the upper end, the cross-section of the dropping pipe is preferably broadened, so that the jets of molten material discharging from the distributing device first of all conglomerate in the form of drops due to a sufficiently high initial fall velocity. The material divided into drops then passes with decreased velocity downward within the cooling air current which rises upward with sufficient velocity to so reduce the rate of fall.

The bottom of the granulating tower is made with oblique walls, the inclination of which exceeds the angle of repose of the granulated material, i. e. the maximum angle at which the particular material will rest on the bottom without sliding off, which is to a certain extent determined by the coefficient of friction. In this manner, the material can automatically pass into the discharge opening, so that no mechanical device for the removal of the mass is required. Any tendency to adhere to the walls of the funnel-shaped bottom of the tower may be eliminated by a rhythmical vibrating of the walls of the funnel.

The vertical down-pipe of the granulating apparatus may also be rhythmically vibrated in order to prevent the baking fast of the solidifying material from the molten liquid. The conical bottom surface of the granulating tower which passes into the discharge opening, can also consist of grid plates arranged in the form of steps between the gaps of which air or other cooling gases are blown in.

Ordinary granulating towers have the disadvantage that a part of the molten materials drops come into contact with the walls of the tower when dropping. This material solidifies and adheres to the walls. After a relatively long period of operation, the granulating towers therefore generally have a rather heavy crust of salts on their inner walls, which considerably disturbs the proper operation of the granulating apparatus.

These disadvantages can be avoided according to the present invention if the gases flowing in counter-current to the molten material which has been divided into drops, move along the walls of the granulating container at a higher velocity than at the central cross-section of the tower. In the vicinity of the tower walls gases flowing with sufficient rapidity blow the molten drops away from the walls so that the molten mass has only a slight chance of baking on. It is advisable to increase the velocity of the gases flowing upward along the inner walls of the granulating container in those zones where the molten drops are in a condition of incipient solidification and have a particularly strong tendency to bake on.

An increased flow of velocity of the cooling gases flowing along the tower walls can be obtained either by vacuum or pressure, in which case the gases enter through suitable openings provided in the walls of the container. It is particularly advantageous if slots which are parallel to the walls of the container are used as gas inlet openings. The granulating tower can, for this purpose, be developed in a telescopic manner of inter-engaging annular sections which become increasingly narrower from the top toward the bottom, in which connection the slots which serve as the entrance for the cooling gases remain at the joints between consecutive tower sections.

The introduction of the cooling air takes place at the lower end of the granulating container by means of screen surfaces, slots or openings arranged along the outer surface, particularly at the places where the aforementioned telescopically engaging tubular sections join each other. The removal of the heated air takes place at the upper end of the granulating apparatus. Intermittent air admission can also be used if the granulating receptacle is provided, for example, at the central portion of its height, with a special admission and discharge line for the quantities of air which are to be blown in.

The material which is to be granulated is charged in finely divided condition at the top of the granulating tower. The distributing of the molten material can be effected in the customary manner by means of rotating screen members which are arranged at the top of the granulating apparatus. In this connection the molten material is thrown apart by centrifugal action, in most cases to such an extent that the granulating apparatus must be of relatively large diameter. For this reason it is advantageous to add the molten material by means of a screen trough.

The melting receptacle, provided with a screen bottom, effects an extremely good and uniform distribution of the molten material and accordingly also an excellent granulation provided that it is rhythmically shaken. The rhythmical motion of the receptacle provided with the screen bottom can be brought about in any desired manner. It is preferable for the receptacle to rest in such a manner that it can vibrate on springs, or be suspended by springs. In this connection, the receptacle can be connected with an eccentrically rotating flywheel which causes rhythmic vibrational motion in the known manner.

A few embodiments of the apparatus in accordance with the present invention for the granulation of molten material are shown in the drawing.

The apparatus used for carrying out the process in accordance with the present invention consists in the simplest case of a vertical pipe 1 which flares out conically at its upper part 2 and has a round or angular cross-section. The melt 3, which is to be granulated, is contained in the receptacle 4 and discharges downward in drops through the screen bottom of said receptacle. The solidified drops collect in the discharge funnel 5 (Fig. 1) and can be removed either continuously or intermittently by means of an adjustable flap.

The material removed in the form of granules at the lower end of the granulating device (Fig. 2), can also continuously drop onto a conveyor belt 22, by means of which it is conducted away for further use or further treatment.

The lower part of the granulating apparatus as shown in Figs. 1 and 2 in accordance with the present invention, is surrounded by an annular receptacle 7 which is connected with the granulating pipe 1 by slots 8. Cool air is blown in with a sufficient velocity through the pipe 9. The air rises upward in pipe 1, decreases the dropping speed of the molten drops due to its flow velocity, and leaves the apparatus through pipe 10 (Fig. 2) or 15 (Fig. 1). In the upper widened part 2 of the granulating device, the velocity of drop is decreased only slightly, so that the molten drops are separated from one another due to their rapid movement.

For the intermittent admission of cooling air, the granulating apparatus (Fig. 1) is provided, for instance, at its mid-height, with an annular container 11 having a false bottom 12. The air blown into the lower part of the drop pipe 1, by means of the annular container 7 and the screen openings 8, rises upward with sufficient velocity and leaves the granulating apparatus through pipe 15. In order to replace the quantity of air which is discharged, new cooling air is blown in by means of pipeline 16. This air rises further upward in pipe 1 and is discharged in sufficiently heated condition through pipeline 17.

For an improved division of the molten material into drops, the material container 4, provided with the screen-shaped bottom, can be supported on coil springs 19 or leaf springs 20. Furthermore, this receptacle can be provided at its top or at its side walls with a vibration apparatus 21 which brings about the desired rhythmical motions of the receptacle, for example by means of eccentrically rotating masses. In the embodiment shown in Figs. 1 and 2 of the granulating apparatus in accordance with the present invention, the side walls of the discharge funnel 5 have such an inclination that the granulated material can discharge without any difficulty. The bottom of the granulating tower can be constructed with a considerably smaller inclination if this bottom is developed as a grid and if gases are blown through it from below with sufficient velocity.

The discharge bottom for feeding the granulated material to the discharge opening, can also be arranged in the form of steps. For this purpose, there is preferably used a smaller receptacle connected in front of the discharge opening, in which the granulated material can pile up, up to a certain layer height. This piled material can be blown through by means of cool air in order to complete the cooling and granulating of the solidified material. The main portion of the cooling gas is in this case blown in above the plate grid.

A granulating apparatus constructed on these principles is shown in Fig. 3.

23 is a cylindrical container of, for instance, round cross-section. The material to be granulated is introduced in molten condition through pipeline 24. By means of screen openings 25 and possibly also with the use of a shaking device 26, the melt is divided into drops and falls downward within container 23.

On the bottom of the granulating container 23, there is arranged a funnel-shaped grid consisting of individual plates 27 over which the granulated material flows to the adjustable discharge opening 28. The air required to cool the molten downward-dropping material is fed in part through pipe connection 29 below plate grid 27 and in part through pipe connection 30 above the solidified granular layer which collects on plate grid 27.

The gases blown in leave the apparatus at its upper end through the pipe connection 31. Depending on the size of the opening of the discharge pipe 28, a higher or lower layer of material piles up on the plate grid 27. This layer can be treated, for instance, cooled or dried, in a suitable manner by means of quantities of gas entering through pipeline 29.

Instead of having the granulated material driven downward only over a plate-shaped false bottom, the granulated material can also flow over several alternately conically shaped and funnel shaped plate grids before leaving the granulating apparatus. In this manner, the utilization of the gases used for the after treatment of the granulated material can be improved greatly.

An embodiment of the new granulating apparatus, operating with a double plate grid, can be seen in Fig. 4.

At the lower end of the granulating apparatus, a conically shaped or step-shaped grid bottom is constructed from horizontal, annular, or step-shaped plates 32. A conical grid bottom is used for granulating containers of round cross-section, while granulating containers of rectangular cross-section require step-shaped grid surfaces.

Below the false bottom, consisting of plates 32, there is arranged a funnel-shaped grid 33 which conveys the granulated material into the discharge opening 34, the cross-section of which can be varied by means of a movable flap. Below the funnel-shaped grid 33, gases are introduced through pipeline 35, which first of all flow through the material travelling over the grid surface 33 and thereupon through the material flowing downward over the conically shaped grid bottom 32. Thereupon, these gases rise upward within the granulating container 23 and mix with the cooling gases blown in through pipe connection 36. The entire quantity of gas introduced is discharged at the upper end of the granulating container through a pipeline 37.

In Figs. 5 and 6 of the drawing, granulating containers are shown in which the gases flowing in counter-current to the downward dropping material have a particularly high velocity along the walls of the tower.

The material to be granulated is introduced in molten condition at the top of the granulating apparatus into a trough 38 (Fig. 5) provided with a screen-shaped bottom. The uppermost part of the granulating apparatus consists of a cylindrical pipe 39 of round or angular cross-section, which flares out upward in the form of a funnel. This head section 39 is connected with a fan or some other gas suction device 40 which blows the heated gases out through line 41. Below the head section 39, there are provided further container rings 42, 43, 44 and 45, which have the same cross-sectional shape as the head section, but are progressively narrower in downward direction.

Between the individual tower sections 39, 42, 43, 44 and 45, there remain in this manner annular slots 46 through which the fan 40 draws in cooling air from the outside. This cool air flows upward, particularly along the inner walls of the container, so that a higher air velocity prevails at these places than in the free cross-section of the granulating tower.

At the lower end of the granulating apparatus, there is arranged a discharge funnel 47 which feeds the granulated material to the discharge opening 48. This discharge opening may be provided with a movable flap which controls the discharge of the granular material in such a manner that there is always present within funnel 47 a certain supply of material which prevents the entrance of gas through discharge opening 48.

It is particularly advantageous if the entrance of the cooling gases is concentrated in the embodiment of the granulating apparatus shown in Fig. 5 in those zones of the tower where experience has shown that the solidifying of the molten drops commences, and where there is a particularly great tendency for the granulated material to bake onto the walls. A granulating apparatus constructed in this manner is shown in Fig. 6.

A fan 49 forces cool air into a container 50 which surrounds the telescopically arranged tower slots 51. The air blown in escapes through a discharge line 52 located at the top of the granulating apparatus. The air flowing in from the fan 49 with sufficient pressure has an injector effect to draw in further quantities of air from the lower edge 53 of the granulating container (which is open at the bottom). These quantities of air from 53 mix with the quantities of air which are blown in and flow in counter-current to the falling drops of the melt which is to be solidified. The solidified, granulated material drops into a funnel 54 and is further conveyed from there in the customary manner.

Also in connection with the embodiments of the granulating receptacle in accordance with the invention as shown in Figs. 5 and 6, the side walls or the individual tower sections can be placed in rhythmical vibration by a shaking apparatus 55 as shown in Fig. 6, in order to prevent an adherence of the solidified molten drops to the tower walls.

As shown in Fig. 6a, at the lower end of the granulating container there may also be arranged instead of the funnel 54 a plate grid or a series of superimposed grid surfaces 54a, as shown in Figs. 3 and 4, over which the solidified material travels downward and is thereupon subjected to a further treatment by secondarily admitted air.

An increased gas flow velocity at the inner walls of the granulating tower can be obtained by means of an annular nozzle 56 arranged at the lower edge of the tower (Fig. 7), as well as by telescopic wall slots. The fan 57 in this case blows cold air into a closed annular space 58 which surrounds the lower end of the granulating tower. This annular space is limited in its inside by a pipe 59, the outer surface of which is only a slight distance away from the inner surface of the granulating tower. The air blown in flows upward with a sufficiently high velocity along the inner walls of the granulating tower, and in this way practically completely prevents the baking on of solidified drops.

By means of a sufficient pressure of the gases discharging through the annular nozzle 56, there is produced a suction effect which draws further quantities of gas into the granulating tower 60 at the lower open end 60. These quantities of gas flow essentially counter-current to the downward dropping molten drops within the cross-section of the tube.

The blown and sucked in quantities of air are discharged at the top of the granulating apparatus through pipeline 61. The granulated material collects in a funnel 62 located below the granulating apparatus.

By means of the granulating method in accordance with the present invention and the apparatus used in order to carry it out, i. e. by the use of sufficiently rapid upward flowing cold gases, the dimensions of granulating towers can be substantially reduced. For example, in the solidification of calcium-ammonium nitrate fertilizers, there are today used granulating towers of a height of 25 meters and a diameter of 18 meters. With the same quantities passing through, the granulation of calcium-ammonium nitrate can be carried out successfully in a granulating tube according to the present invention of a relatively small cross-section and considerably reduced height.

I claim:

1. Apparatus for the granulation of chemical substances from their melt, which comprises a substantially vertical, elongated granulation tower, at least one substantially vertical annular gas inlet slot defined in the lower portion of said tower extending substantially parallel to and adjacent the inner surface of the tower wall, gas-propelling means positioned for passing a stream of gas upward through said gas-inlet slot and said tower, whereby the gas has the greatest velocity along the inner surface of the tower wall, molten liquid dispensing means positioned at the top of said tower for releasing drops of molten liquid into said tower, and a granular material outlet at the bottom of said tower.

2. Apparatus according to claim 1, in which said annular gas inlet slot is defined between an upper and lower individual tower section, said lower tower section being of smaller diameter and concentrically positioned within said upper section to define said gas inlet slot.

3. Apparatus according to claim 2, in which said tower is defined by individual tower sections with each section being of smaller cross-section than the immediately higher section and positioned concentrically within the immediate higher section to define a gas-inlet slot therebetween.

4. Apparatus according to claim 3, in which said gas-propelling means are gas-exhaust means positioned at the upper portion of said tower for drawing gas upwards therethrough.

5. Apparatus according to claim 4, in which said tower has a funnel-shaped bottom defining said granular material outlet at the center thereof.

6. Apparatus according to claim 5, in which said tower is broadened at its upper portion below said molten liquid dispensing means.

7. Apparatus according to claim 1, in which said tower is defined by individual tower sections with each section having a smaller cross-section than the immediately higher section and concentrically positioned within the immediately higher section to define an annular gas inlet slot therebetween, and in which said gas-propelling means comprises a manifold positioned around said annular gas inlet slots and blower means for forcing gas into said manifold.

8. Apparatus according to claim 7, in which said tower has a substantially open bottom.

9. Apparatus according to claim 8, including a discharge funnel positioned below in spaced relation to said open bottom for receiving granular material falling through said bottom.

10. Apparatus according to claim 1, in which said tower has an upper section and a substantially open-ended lower section, said lower section being of smaller diameter than said upper section and positioned concentrically within said upper section to define said annular gas inlet slot therebetween, and in which said gas-propelling means comprises gas-blower means positioned for blowing gas upward through said annular gas inlet slot, whereby additional gas is drawn in and forced upward through the open bottom of the lower tower section.

11. Apparatus according to claim 10, including a funnel-shaped member positioned below and in spaced relation to the lower tower section for receiving granular material passing therethrough.

12. Apparatus according to claim 1, in which said tower is broadened at its upper portion below said molten liquid dispensing means.

References Cited in the file of this patent

UNITED STATES PATENTS

| | | |
|---|---|---|
| 496,044 | Deniston | Apr. 25, 1893 |
| 1,088,635 | Stevene | Feb. 24, 1914 |
| 1,837,869 | Jewett et al. | Dec. 22, 1931 |
| 1,924,788 | Hobson | Aug. 29, 1933 |
| 2,038,251 | Vogt | Apr. 21, 1936 |
| 2,180,968 | Schorn et al. | Nov. 21, 1939 |
| 2,455,908 | Slayter | Dec. 7, 1948 |
| 2,500,801 | Church | Mar. 14, 1950 |